United States Patent [19]
Maguire et al.

[11] Patent Number: 5,451,792
[45] Date of Patent: Sep. 19, 1995

[54] GAMMA RADIATION DETECTION

[75] Inventors: Dennis D. Maguire, Rise Park; David J. Foster, Swindon, both of United Kingdom

[73] Assignee: Hartwell Dosimeters Limited, Didcot, England

[21] Appl. No.: 219,947

[22] Filed: Mar. 30, 1994

[30] Foreign Application Priority Data

Mar. 31, 1993 [GB] United Kingdom ............... 9306751

[51] Int. Cl.⁶ .............................................. G01T 1/04
[52] U.S. Cl. .............................................. 250/474.1
[58] Field of Search ................................... 250/474.1

[56] References Cited

U.S. PATENT DOCUMENTS 2,757,292  7/1956  Schulman et al. ............... 350/474.1

FOREIGN PATENT DOCUMENTS 1-272930  10/1989  Japan ............................. 250/474.1

Primary Examiner—Constantine Hannaher
Attorney, Agent, or Firm—Cumpston & Shaw

[57] ABSTRACT

A gamma radiation dosimeter comprises a polyester film substrate, of which a central circular region is coated with a gamma-radiation sensitive layer which is covered by an overlayer. The radiation-sensitive layer is formed from styrene-acrylonitrile copolymer and contains 1-bromoadamantane and a leuco dye. The overlayer is formed from an acrylic resin binder containing a UV-absorber. The central region is surround by an annular region which is divided into six equally-sized sections, each of which is printed in a color which corresponds to the color developed in the central region when it has been exposed to successive increasing amounts of gamma radiation. After exposure of the device, the amount of radiation to which the device has been exposed can be determined by comparing the color generated in the region with the colors of the six sections. The color of the section most closely corresponding to that of the central region indicates the dose of gamma radiation which the device, and any other object similarly exposed, has received.

32 Claims, 1 Drawing Sheet

GAMMA RADIATION DETECTION

This invention relates to the detection of gamma radiation.

Gamma radiation is used for the sterilisation of medical articles such as surgeons' gowns and masks and also syringes, implants, etc.

Irradiation by gamma rays has also been used as a means of disinfection and preservation of foods.

In the medical field, irradiation by gamma rays is usually carried out using the isotope $_{27}Co^{60}$ as a source of gamma rays. The radioactive isotope is incorporated into a steel "pencil" to which the articles to be sterilised are exposed. There are various regulations in place governing sterilisation of medical articles by gamma radiation. Typically it is required that articles to be sterilised be exposed to 25 kGy of radiation. The level used for treatment of foodstuffs is typically 1 to 10 kGy. Various devices have been proposed or manufactured as indicators of exposure to gamma radiation. One such device comprises a label carrying a circle of an orange dyestuff which becomes red on exposure to gamma radiation. The colour change is however nonquantitative and there is no indication of the radiation dose. Moreover, the colour change takes place slowly during exposure to visible light. It is also known to supply dosimeters consisting of coloured polymethylmethacrylate plastic "chips" which undergo a colour change upon exposure to gamma radiation. The colour change can however only be measured spectrophotometrically and such measurement is therefore necessary in order to ascertain the dose of radiation exposure.

U.S. Pat. No. 2957080 (Schulte et al) describes the determination of quantities of gamma radiation and X-radiation by the exposure of a detection system comprising a halogenated compound and a leuco dye which functions as a sensitiser and indicator. The detection system is a liquid-phase system which requires subsequent colorimetric measurement of the colour produced in order to determine the quantity of radiation to which the detection system has been exposed. Specific halogenated compounds disclosed are chloroform, bromoform, tetrachloroethane and 1,1,2-trichloroethane. Specific leuco-dyes are the leuco bases of crystal violet and malachite green.

GB-A-1180883 (Horizons) describes a photosensitive medium which is sensitive to radiation of wavelengths longer than 400 nm. The medium consists of (a) a leuco compound, (b) a halogen-containing activator and (c) a polymer in which (a) and (b) are dispersed or dissolved. A latent, nonvisible image is produced in the photosensitive medium upon exposure to radiation of the stated wavelength and requires subsequent fixing and development to produce a visible image. Development is described in GB-A-1177679 (Horizons) and is carried out by exposure to red or near-IR light. To produce sufficient sensitivity to X-rays, it is desirable for the medium to include photochemically-inert atoms of high atomic number, such as mercury, lead, bismuth, barium and tungsten, in order to generate high energy photoelectrons which lead to production of the latent image.

U.S. Pat. No. 4598036 (Iwasaki et al) describes a printout composition which comprises a binder, a leuco dye and a photooxidising agent which is radiation sensitive, for example to X-rays. Halogenated hydrocarbons, including carbon tetrabromide, are mentioned as typical photooxidising agents. The leuco dye may be one of a range of carbazolylmethane compounds which are disclosed. The binder is preferably light-curing, so that the composition can be image-wise exposed and then developed to remove uncured binder.

EP-B-0255479 (Ciba-Geigy AG) describes an assembly for monitoring ionising radiation, the assembly containing polyvinylchloride or polyvinylidene chloride as a halogen source, and a colour former according to one of various stated general formulae.

EP-A-0389113 (Minnesota Mining and Manufacturing Co) describes dosimeter films which are sensitive to high-energy radiation and which comprise an acid-sensitive leuco dye in a halogen-containing polymer.

According to a first aspect of the present invention, there is provided a gamma-radiation detector comprising,
  (a) a substrate,
  (b) a gamma-radiation sensitive layer on the substrate, and, optionally,
  (c) an overlayer extending over the radiation-sensitive layer,
  wherein the radiation-sensitive layer (b) comprises
    (i) a polymeric binder,
    (ii), additional to (i), a halogen atom source capable of producing halogen atoms in response to exposure to gamma radiation, and
    (iii) a leuco dye which is capable of undergoing a visually apparent change to a coloured form in response to production of halogen atoms by the halogen atom source when exposed to gamma radiation
  and wherein any overlayer (c) absorbs ultra-violet light in order to render the detector insensitive thereto.

Suitable substrate materials include polyester films, polypropylene films, polyethylene films and the like, and laminates of paper and these materials.

Suitable overlayer materials include acrylic resin binders, such as *Surcol 836 containing UV absorbing compounds such as *Aduvex 12 and/or *Parsol 1789.
*"Surcol" is a registered trade name of Allied Colloids.
*"Aduvex" is a registered trade mark of Octel, Ltd.
*"Parsol" is a registered trade mark of Givauden & Co., Ltd.

The polymeric binder of the radiation-sensitive layer may be, for example, a styrene-acrylonitrile copolymer. It is in any event essential that the polymer binder be non-acid, in order to prevent colour-formation on mixing the components prior to exposure.

According to a second aspect, the invention provides a method of detecting gamma radiation, comprising
  (a) providing a gamma-radiation sensitive system comprising components (i), (ii) and (iii) referred to above,
  (b) exposing the radiation-sensitive system to gamma radiation,
  (c) measuring or observing the resulting colour change, and, optionally,
  (d) determining the exposure to gamma radiation to which the system has been exposed.

Determination of the degree of gamma radiation exposure is preferably by comparison between the colour developed by the system with a colour standard established for a predetermined degree of exposure.

The comparison may be carried out visually but is preferably carried out instrumentally, for example by use of a reflection densitometer and comparison of the measured value with a calibration curve produced using samples exposed to predetermined doses of radiation.

According to a preferred feature of the present invention, the halogen source (ii) comprises at least one compound of the formula $C_{10}H_{15}X$ having the structure

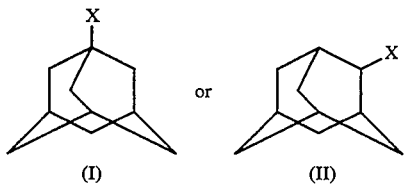

wherein X is F, Cl, Br or I.

Most preferred is 1-bromoadamantane (X=Br in formula I). 2-haloadamantanes can however also be used, as can other 1-haloadamantanes, such as 1-chloroadamantane and 1-iodoadamantane.

Compounds according to formulae (I) and (II) have been found to be particularly effective halogen sources as they are largely insensitive to visible and ultra-violet light and are also stable and nonvolatile. Because of the insensitivity of the compounds to visible and ultra-violet light, the overlayer mentioned above is not necessary when these compounds are used. Inclusion of an overlayer may nevertheless be desirable in order to prevent any slight discoloration which might arise upon prolonged exposure to high levels of visible or ultra-violet light.

The present invention also provides in a second aspect a gamma-radiation sensitive system comprising a carrier, a source of halogen atoms comprising at least one haloadamantane according to formula (I) or (II) and capable of producing halogen atoms in response to exposure of gamma radiation, and a leuco dye which is capable of undergoing a colour change in response to production of halogen atoms by the haloadamantane when exposed to gamma radiation.

Most preferred is 1bromoadamantane. 2-haloadamantanes, preferably 2-bromoadamantane, can however also be used, as can other 1-haloadamantanes, such as 1-chloroadamantane and 1-iodadamantane.

The colour change produced is preferably visually apparent.

The carrier can be liquid but is preferably solid, more preferably a polymeric binder.

When the colour change produced is visually apparent and the carrier a polymeric binder, the system can provide features (i), (ii) and (iii) of the gamma-radiation detector according to the first aspect of the invention.

Suitable leuco dyes are any of those commonly used in carbonless copy paper, wherein capsules containing a solution of the dye are ruptured under the pressure of a writing implement and thereby typically brought into contact with an acid clay coated on the reverse side of the opposing sheet, the clay causing formation of the dyestuff from the leuco-version. Such leuco-dyes include leuco malachite green, leuco crystal violet and *Pergascript Blue SR-B which is available from Ciba-Geigy. (*Pergascript is a registered trade mark of Ciba-Geigy.) U.S. Pat. No. 4598036, EP-B-0255479 and EP-B-0389113, all three of which are full incorporated herein by reference, all disclose classes and examples of suitable compounds.

The leuco dye sold under the trade mark Pergascript Blue is believed to be benzenamine 4,4'-[(9-butyl-9H-carbazol-3-yl)methylene]bis[N-methyl-N-phenyl], having the structure:

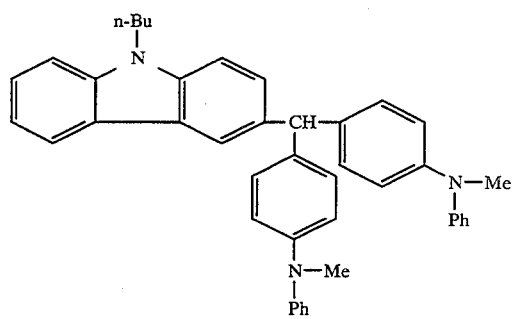

Another useful leuco dye is one having the related structure in which the n-butyl group is replaced by an ethyl group.

In any aspect of the invention, the halogen source preferably constitutes from 5% to 95% by weight of the radiation-sensitive layer or system, more preferably 30% to 70% by weight and most preferably 40% to 60% by weight.

In any aspect of the invention, the leuco dye constitutes from 1% to 10% to by weight of the radiation-sensitive layer or system, more preferably 3% to 8% by weight and most preferably about 5% by weight.

The weight ratio of halogen source to leuco dye is preferably in the range from 20:1 to 1:1, more preferably from 15:1 to 5:1 and most preferably about 10:1.

Advantageously, the radiation-sensitive layer or system contains titanium dioxide in an amount of 5% to 25% by weight, preferably 10% to 20% by weight and more preferably about 15% by weight, of the carrier. The inclusion of titanium dioxide has been found to flatten the colour curve for the coloured form of the system. This increases the accuracy of any comparison or measurement of the developed colour.

In a detector according to the first aspect of the invention, the gamma-radiation sensitive layer and the overlayer advantageously occupy a first portion of the surface of the substrate, the first portion being in close proximity to at least one second surface portion which is coloured to correspond to the colour attained by the radiation sensitive layer when exposed to a predetermined amount of gamma-radiation.

Exposure of such a device to the predetermined amount of radiation can be detected by a simple visual comparison between the first and second portions.

Preferably, the detector has a plurality of second surface portions, each of which has a different colour corresponding to a respective different predetermined amount of gamma radiation.

A particularly preferred physical layout of the first and second surface portions is one in which the first portion is positioned centrally with the second portions surrounding it. An example of such a layout is one in which the first portion is circular and the second portions form an annulus around the first position, the second portions occupying successive portions of the annulus.

An embodiment of the invention will now be described by way of example with reference to the drawing, in which.

Figure 1:
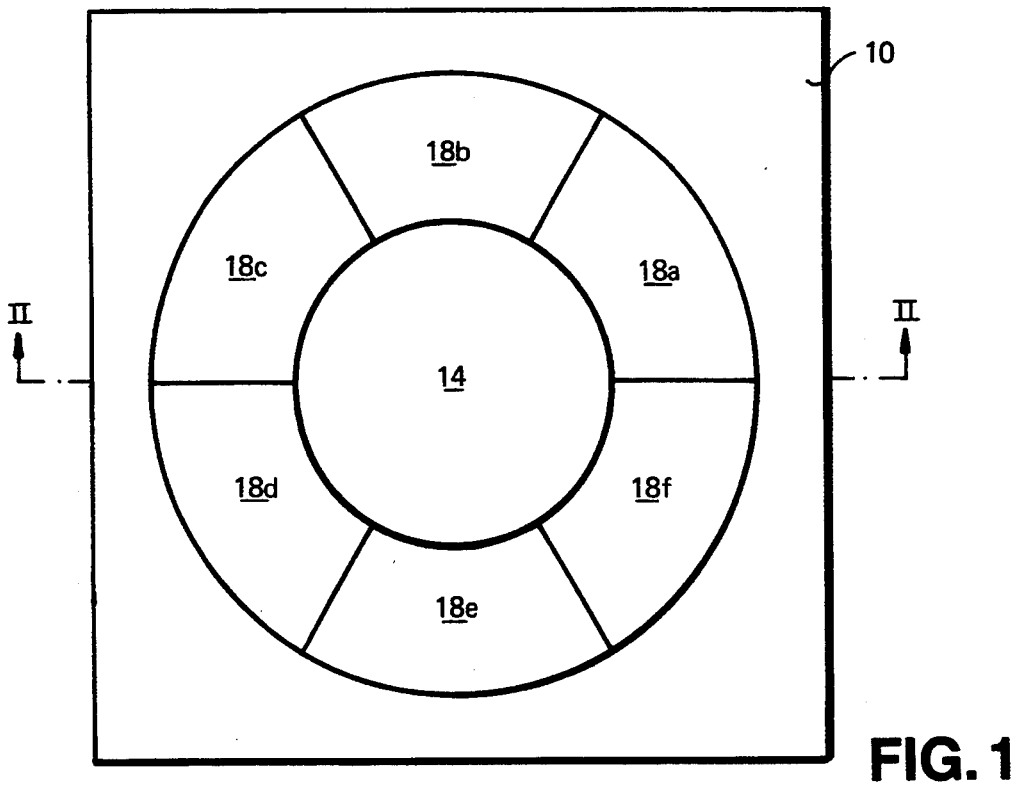
FIG. 1 is a schematic plan view of a radiation dosimeter.
Figure 2:
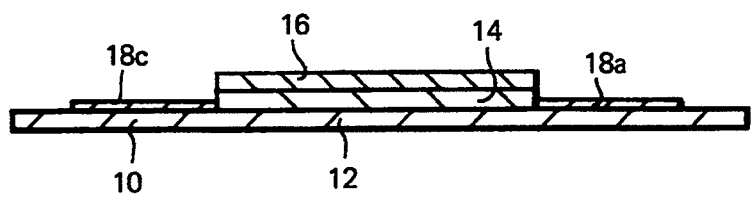
FIG. 2 is a section on the line II—II of FIG. 1.

The dosimeter shown in FIG. 1 comprises a substrate 10 which is formed from polyester film. A central circular region 12 of the substrate is coated with a gamma-radiation sensitive layer 14 which is covered by an overlayer 16. The radiation-sensitive layer 14 and overlayer 16 are constituted as described in example 1 below.

The central circular region 12 is surrounded by an annular region 18 which is divided into six equally-sized sections 18a . . . 18f. Each section 18a . . . 18f is printed in a colour which corresponds to the colour developed in the central region 14 when it has been exposed to successive increasing amounts of gamma radiation, for example 15 kGy, 20 kGy, 25 kGy, 30 kGy and 35 kGy.

The device is exposed in use to gamma radiation. After exposure, the amount of radiation to which the device has been exposed can be determined by comparing the colour generated in the region 14 with the colours of the sections 18a . . . 18f. The colour of the section most closely corresponding to that of the central region indicates the dose of gamma radiation which the device, and any other object similarly exposed, has received.

The invention will be described further with reference to the following examples.

EXAMPLE 1

A coating-lacquer was made up as follows:

| | |
|---|---|
| *Lauran 368R (styrene-acrylonitrile copolymer) | 2 pts |
| 1-Bromoadamantane | 2 pts |
| *Pergascript Blue S-RB | 0.2 pts |
| Methyl Ethyl Ketone | 6 pts |

This was coated onto *Melinex 339 polyester film to give a dry coating thickness of 30 μm. The coated film was then overcoated with a solution consisting of:

| | |
|---|---|
| *Surcol 836 | 8.8 pts |
| *Aduvex 12 | 0.4 pts |
| *Parsol 1789 | 0.2 pts |
| Methyl Ethyl Ketone | 13.125 pts |
| Water | 40.0 pts |
| 880 Ammonia | 23.0 pts | to give a total coating of 36 to 38 μm. (*"Lauran" is a registered trade mark of BASF. "Pergascript", "Surcol", "Aduvex" and "Parsol" are registered trade marks of the proprietors mentioned above.)

Samples of the coated and overcoated film were then exposed to gamma radiation at successively increasing levels and the colour developed was determined by measurement of its reflectance density. The following results were obtained:

| Dose (kGy) | Colour (absorbance units) |
|---|---|
| 0 | 0.10 |
| 5 | 0.27 |
| 10 | 0.40 |
| 15 | 0.50 |
| 20 | 0.60 |
| 25 | 0.68 |
| 30 | 0.76 |

It will be seen that the colour developed is substantially proportional to the radiation dosage range.

A sample exposed to 25 kGy of gamma radiation was environmentally tested at different temperatures and humidities and the colour determined by measurement of its reflectance density. The following results were obtained:

| | Colour (absorbance units) |
|---|---|
| Temperature (°C.) | |
| 25 | 0.68 |
| 70 | 0.68 |
| 100 | 0.67 |
| Relative Humidity (%) | |
| 0 | 0.61 |
| 32 | 0.67 |
| 52 | 0.61 |
| 75 | 0.67 |
| 98 | 0.65 |

A colour of a sample exposed at 25 kGy was periodically measured to test for change upon aging. The following results were obtained:

| | Colour (absorbance units) | |
|---|---|---|
| Days | at 25° | at 50°C. |
| 0 | 0.67 | 0.67 |
| 1 | 0.66 | 0.68 |
| 3 | 0.68 | 0.70 |
| 5 | 0.67 | 0.69 |
| 20 | 0.67 | 0.69 |
| 40 | 0.60 | 0.70. |

EXAMPLES 2 to 5

The procedure of example 1 was repeated using, successively, 1-bromoadamantane, 1- iodoadamantane, 2-bromoadamantane and 1-chloroadamantane. The overcoating layer was omitted. The following results were obtained when the coated film samples were exposed to gamma radiation and the colour developed determined as in example 1.

| | Colour (absorbance units) | | | |
|---|---|---|---|---|
| Dose (kGy) | Ex 2 (1-bromo) | Ex 3 (1-iodo) | Ex 4 (2-bromo) | Ex 5 (1-chloro) |
| 0 | 0.1 | 0.1 | 0.1 | 0.1 |
| 5 | 0.26 | 0.24 | 0.25 | 0.24 |
| 10 | 0.37 | 0.36 | 0.36 | 0.36 |
| 15 | 0.47 | 0.47 | 0.45 | 0.44 |
| 20 | 0.57 | 0.56 | 0.52 | 0.50 |
| 25 | 0.66 | 0.65 | 0.59 | 0.56 |
| 30 | 0.74 | 0.74 | 0.63 | 0.59 |
| 35 | 0.80 | 0.80 | 0.65 | 0.65 |

Good proportionality between colour developed and radiation dosage was again observed.

We claim:

1. A gamma-radiation sensitive system comprising a carrier, a source of halogen atoms which comprises at least one haloadamantane and is capable of producing halogen atoms in response to exposure of gamma radiation, and a leuco dye which is capable of undergoing a color change in response to production of halogen atoms by the haloadamantane when exposed to gamma radiation.

2. A system according to claim 1, in which the haloadamantane is 1-bromoadamantane.

3. A system according to claim 1, in which the haloadamantane is 2-bromoadamantane.

4. A system according to claim 1, in which the haloadamantane is 1-chloroadamantane.

5. A system according to claim 1, in which the haloadamantane is 1-iodoadamantane.

6. A system according to claim 1, in which the colour change produced is visually apparent.

7. A system according to claim 1, in which the leuco dye is leuco malachite green, leuco crystal violet or a compound of the formula:

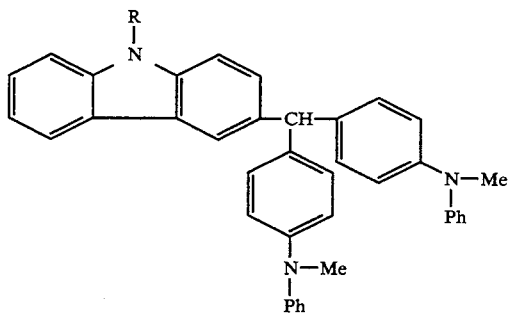

in which R is ethyl or n-butyl.

8. A system according to claim 1, in which the halogen source constitutes from 5% to 95% by weight of the combined amount of carrier, halogen source and leuco dye.

9. A system according to claim 8, in which the halogen source constitutes from 30% to 70% by weight of the combined amount of carrier, halogen source and leuco dye.

10. A system according to claim 9, in which the halogen source constitutes from 40% to 60% by weight of the combined amount of carrier, halogen source and leuco dye.

11. A system according to claim 1, in which the leuco dye constitutes from 1% to 10% by weight of the combined weight of carrier, halogen source and leuco dye.

12. A system according to claim 11, in which the leuco dye constitutes from 3% to 8% by weight of the combined amount of carrier, halogen source and leuco dye.

13. A system according to claim 1, in which the weight ratio of halogen source to leuco dye is in the range from 20:1 to 1:1.

14. A system according to claim 13, in which the weight ratio of halogen source to leuco dye is in the range from 15:1 to 5:1.

15. A system according to claim 1, containing titanium dioxide in an amount of 5% to 25% by weight of the carrier.

16. A system according to claim 15, containing titanium dioxide in an amount of 10% to 20% by weight of the carrier.

17. A system according to claim 1, in which the carrier is solid.

18. A system according to claim 17, in which the carrier is a polymeric binder.

19. A system according to claim 18, in which the binder is a styrene-acrylonitrile copolymer.

20. A gamma-radiation detector comprising a substrate and a gamma-radiation sensitive layer on the substrate, the radiation-sensitive layer comprising a gamma-radiation sensitive system according to claim 17.

21. A detector according to claim 20, in which the substrate is a polyester film, polypropylene film, polyethylene film or a laminate of paper and any of these.

22. A detector according to claim 20, including an overlayer extending over the carrier.

23. A detector according to claim 22, in which the overlayer absorbs ultraviolet light in order to render the system insensitive thereto.

24. A detector according to claim 22, in which the overlayer comprises an acrylic resin binder.

25. A detector according to claim 22, in which the gamma-radiation sensitive layer and the overlayer occupy a first portion of the surface of the substrate, the first portion being in close proximity to at least one second surface portion which is coloured to correspond to the colour attained by the radiation sensitive layer when exposed to a predetermined amount of gamma-radiation.

26. A detector according to claim 25, having a plurality of second surface portions, each of which has a different colour corresponding to a respective different predetermined amount of gamma radiation.

27. A detector according to claim 26, in which the layout of the first and second surface portions is one in which the first portion is positioned centrally with the second portions surrounding it.

28. A detector according to claim 27, in which the first portion is circular and the second portions form an annulus around the first portion, the second portion occupying successive portions of the annulus.

29. A method detecting gamma radiation, comprising
(a) providing a gamma-radiation sensitive system as referred to in claim 1,
(b) exposing the radiation-sensitive system to gamma radiation,
(c) measuring or observing the resulting colour change, and, optionally,
(d) determining the exposure to gamma radiation to which the system has been exposed.

30. A method according to claim 29, in which determination of the degree of gamma radiation exposure is by comparison between the colour developed by the system with a colour standard established for a predetermined degree of exposure.

31. A method according to claim 30, in which the comparison is carried out visually.

32. A method according to claim 30, in which the comparison is carried out by using of a reflection densitometer.

* * * * *

UNITED STATES PATENT AND TRADEMARK OFFICE
CERTIFICATE OF CORRECTION

PATENT NO. : 5,451,792
DATED : September 19, 1995
INVENTOR(S) : Dennis D. Maguire and David J. Foster It is certified that error appears in the above-indentified patent and that said Letters Patent is hereby corrected as shown below:

On the title page, item [73]

Assignee should read -- HARWELL DOSIMETERS LIMITED --.

Signed and Sealed this

Thirteenth Day of February, 1996

Attest:

BRUCE LEHMAN

*Attesting Officer*     *Commissioner of Patents and Trademarks*